United States Patent [19]
Sekine et al.

[11] Patent Number: 6,122,146
[45] Date of Patent: Sep. 19, 2000

[54] AUTOSTOP MECHANISM FOR TAPE DRIVING APPARATUS

[75] Inventors: Haruo Sekine; Yoshio Anzai, both of Tokyo, Japan

[73] Assignee: MEC Co., Ltd., Tokyo, Japan

[21] Appl. No.: 09/136,926

[22] Filed: Aug. 20, 1998

[51] Int. Cl.$^7$ .................................................. G11B 5/027
[52] U.S. Cl. ........................................................ 360/137
[58] Field of Search ..................................... 360/137, 105

[56] References Cited

U.S. PATENT DOCUMENTS

| | | |
|---|---|---|
| 4,809,101 | 2/1989 | Tanaka et al. . |
| 4,905,105 | 2/1990 | Tanaka et al. . |
| 4,935,831 | 6/1990 | Shimbo . |
| 5,402,289 | 3/1995 | Hayashi et al. ......................... 360/105 |
| 5,798,900 | 8/1998 | Shimbo . |
| 5,953,182 | 9/1999 | Hanzawa et al. ....................... 360/105 |

FOREIGN PATENT DOCUMENTS

| | | |
|---|---|---|
| 5-19776 | 10/1986 | Japan . |
| 6-56680 | 7/1988 | Japan . |
| 63-142020 | 9/1988 | Japan . |

OTHER PUBLICATIONS

An English language abstract of JP 63–142020.
An English Language abstract of JP 5–19776.

Primary Examiner—Allen T. Cao
Attorney, Agent, or Firm—Greenblum & Bernstein, P.L.C.

[57] ABSTRACT

A tape apparatus autostop mechanism including a head base for setting a driving apparatus in an operational mode; a lock plate that locks the head base at an operational position in response to movement of the head base; a sensor, attached coaxially to a fast forward gear always rotatable in synchronism with a reel base, following the fast forward gear under contact friction with the fast forward gear, the sensor being urged in a rotational direction of the fast forward gear by the contact friction with the fast forward gear; a swingable reset arm urged in one direction by torque of the sensor while the fast forward gear is rotating in right or left directions; a forward gear having an inner and an outer cam, for transmitting force to the reel base; a swingable reset arm arranged to contact the inner and outer cams and rotatably supported; and a reset spring that presses a kick arm, attached to the reset arm, against the inner and outer cams, whereby when the torque of the sensor disappears as the reel base stops, pressing force of the reset arm against the kick arm via the reset spring also disappears, a cam follower of the kick arm stays apart from the inner cam, the fast forward gear keeps rotating so that the cam follower of the kick arm abuts against the outer cam, causing the kick arm to swing, thereby pressing the lock plate to unlock the head base.

1 Claim, 9 Drawing Sheets

AUTOSTOP MECHANISM FOR TAPE DRIVING APPARATUS

BACKGROUND OF THE INVENTION

1. Field of the Invention

The present invention relates to an autostop mechanism for a tape driving apparatus, and, more particularly, to an autostop mechanism for a tape driving apparatus, which facilitates the use of a spring by separating a sensor from a reel base and attaching the spring to a fast forward gear, whereby friction produced by the urging force of the spring stabilizes the operational force, thus ensuring a stable operation and improved durability.

2. Description of the Related Art

As a rotational detection member is attached to the reel base in an ordinary cassette tape recorder, the reel base has a double gear structure wherein the clutch uses a spring.

The structure in which a sensor is attached to the reel base which has a double gear structure wherein the clutch uses a spring suffers a difficulty to use another spring to acquire the operational force of the sensor. This structure acquires the operational force by means of friction produced by fitting resins together. A variation in precision of parts results in an unstable operation and low durability.

Accordingly, it is an object of the present invention to provide an autostop mechanism for a tape driving apparatus, which employs an improved sensor slip mechanism to prevent a malfunction and improve the operational reliability.

SUMMARY OF THE INVENTION

To achieve the above object, according to one aspect of this invention, there is provided an autostop mechanism for a tape driving apparatus, which comprises:

- a head base for setting the tape driving apparatus in an operational mode;
- a lock plate for locking the head base at an operational position in response to movement of the head base when the head base is moved to the operational position;
- a sensor, attached coaxially to a fast forward gear always rotatable in synchronism with a reel base, in such a way as to be rotatable in both right and left directions, following the fast forward gear by means of contact friction with the fast forward gear, the sensor being urged in a rotational direction of the fast forward gear by the contact friction with the fast forward gear;
- a swingable reset arm to be urged in one direction by a torque of the sensor even when the fast forward gear is rotating in either the right or left direction;
- a forward gear having an inner cam and an outer cam, for transmitting drive force to the reel base;
- a swingable reset arm arranged in contact with the inner and outer cams and being rotatably supported; and
- a reset spring capable of pressing a kick arm, attached to the reset arm, against the inner cam and the outer cam, whereby when the torque of the sensor disappears as the reel base stops, pressing force of the reset arm pressing the kick arm via the reset spring is gone, a cam-contact portion of the kick arm stays apart from the inner cam, the fast forward gear keeps rotating so that the cam-contact portion of the kick arm abuts against the outer cam, causing the kick arm to swing, thereby pressing the lock plate to unlock the head base.

DETAILED DESCRIPTION OF THE PREFERRED EMBODIMENT

A preferred embodiment of the present invention will now be described with reference to the accompanying drawings.

Reference numeral "1" is a fly-wheel 1 to which the drive power of a motor (not shown) is transmitted via an unillustrated belt.

A fly-wheel gear is arranged coaxial to the fly-wheel 1. Reference numeral "3" is a forward arm. A forward gear 4 engages with the fly-wheel gear 2. A send gear 5 is attached integrally and coaxially to the forward gear 4. Reference numeral "6" is a clutch gear 6, "7" is a right reel gear, "8" is a fast forward gear, "9" is a head base, "10" is a lock plate, and "11" is a kick arm which has a release function. Reference numeral "12" is the inner cam of the forward gear 4, which has a heart shape. Reference numeral "13" is the outer cam of the forward gear 4, which has a crescent shape. Reference numeral "14" is a sensor which performs rotational detection and has a sensor blade $14_1$. Reference numeral "15" is a reset arm having a swing function, "16" is a reset spring, "17" is a rewind pulley, is a rewind gear, and "19" is a left reel gear. A center arm 20 has a pin $20_1$ provided at the distal end. A fast forward lever 21 has an engage portion $21_1$ provided at the distal end. A rewind lever 22 has an engage portion 22 provided at the distal end.

Specific Examples of Operation

1. Stop→Play→Autostop

[Transmission of Rotation]

(1) Rotation of Reel System

Transmission via the motor and the belt→fly-wheel 1→fly-wheel gear 2→forward gear 4→send gear 5 attached integrally and coaxially to the forward gear 4→clutch gear 6→reel gear 7→fast forward gear 8.

(2) Rotation of Fly-wheel System

Transmission via the motor and the belt→fly-wheel 1→fly-wheel gear 2→forward gear 4.

[Operation]

Figure 1:
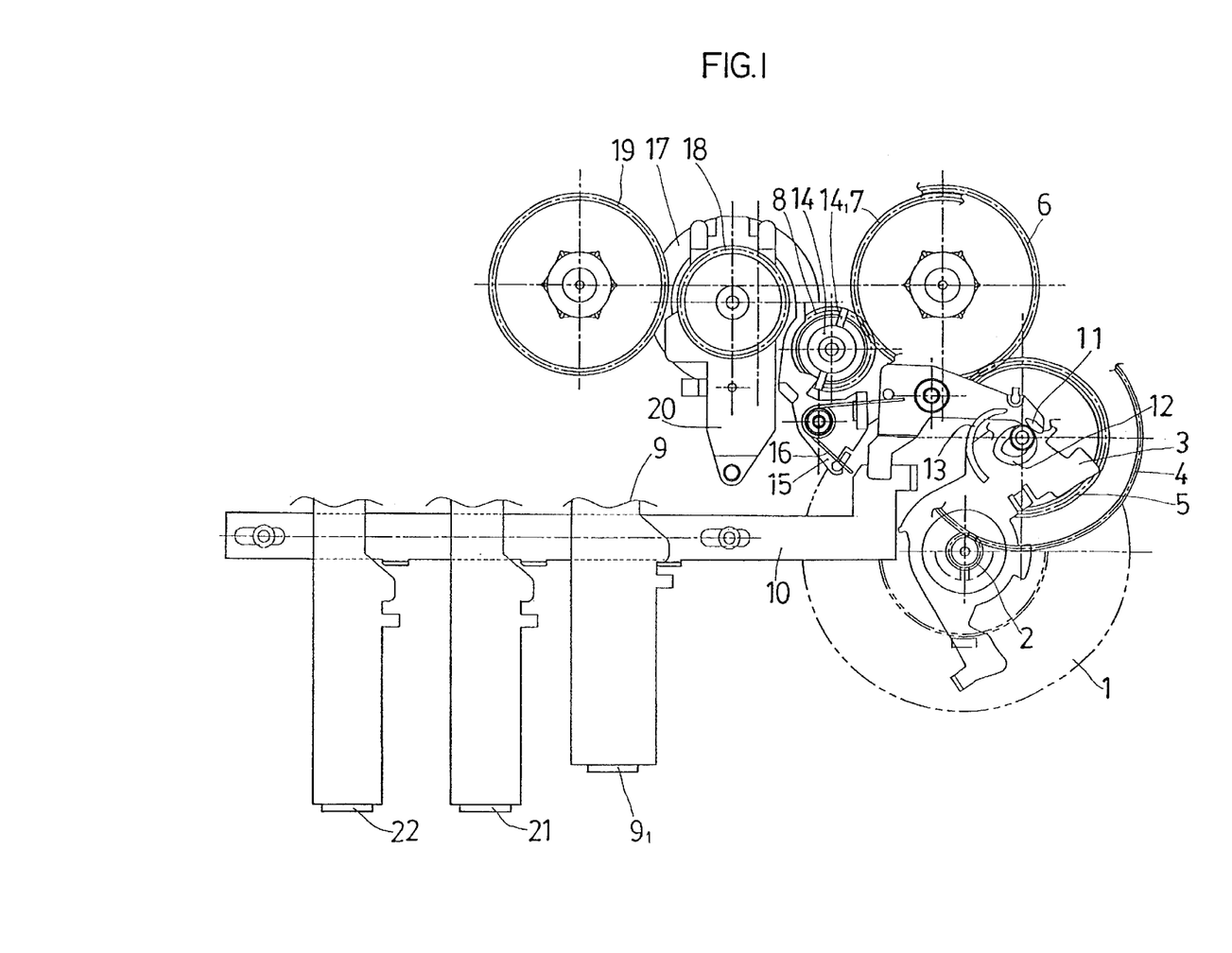
FIG. 1 is a schematic plan view of the interior of a cassette tape recorder equipped with an autostop mechanism according to this invention.

(1) Push the head base 9 via a lever $9_1$→lock plate 10 slides to be locked (FIG. 1).

Figure 2:
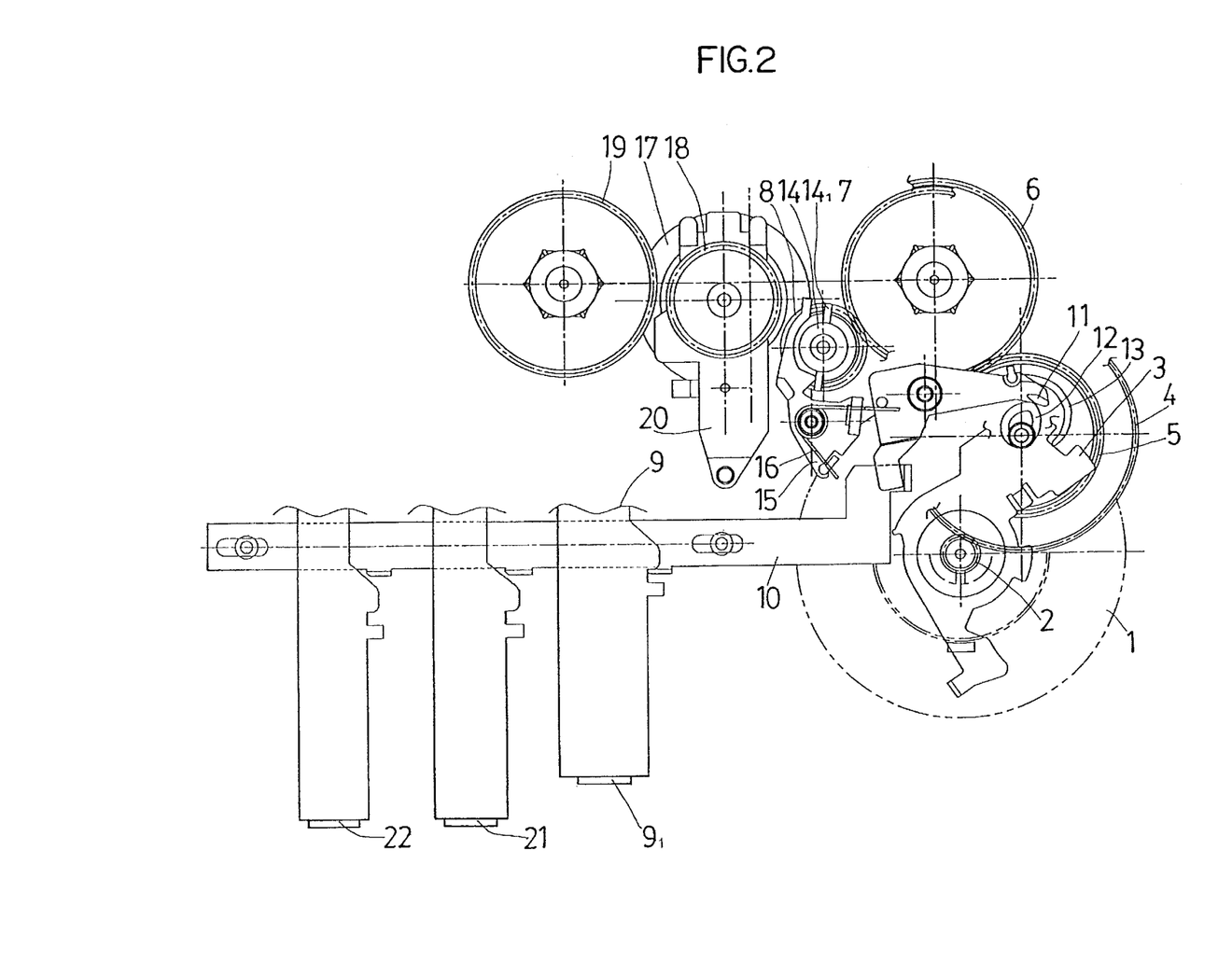
FIG. 2 is a schematic plan view showing a kick arm pushed up by the inner cam of a forward gear.

(2) The rotation transmitted from the motor via the belt causes the fly-wheel and the fly-wheel gear 2 to rotate, and the kick arm 11 is pushed up by the inner cam 12 of the forward gear 4 (FIG. 2).

(3) As apparent from FIG. 2, during the play mode, rotation is transmitted in the route of the forward gear 4→send gear 5 attached integrally and coaxially to the forward gear 4→clutch gear 6→reel gear 7→fast forward gear 8, and the reset arm 15 swings by the blade 14$_1$ of the sensor 14. The reset spring 16 attached to the reset arm 15 also swings, causing the kick arm 11 to return along the hear-shaped inner cam 12 of the forward gear 4, and the play mode continues. (The operations of FIGS. 1 and 2 are repeated.)

Figure 3:
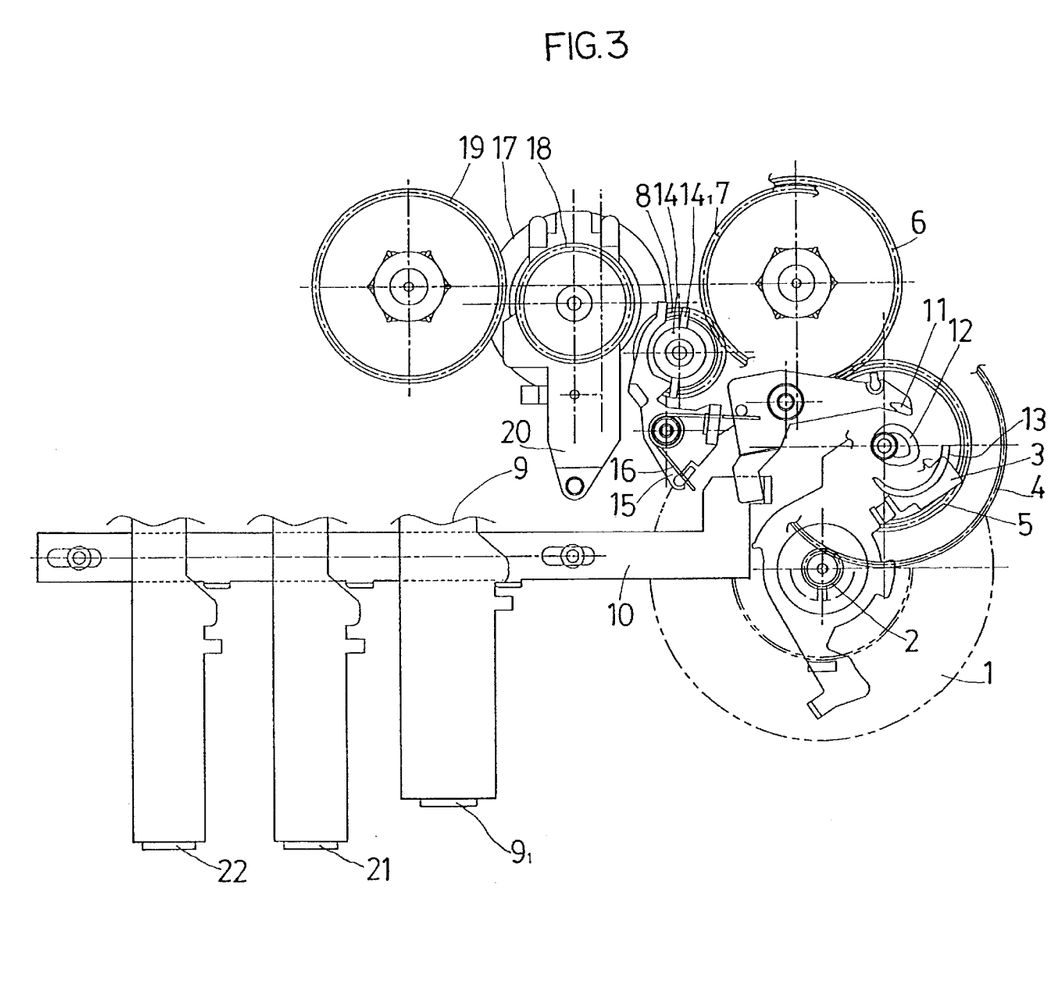
FIG. 3 is a schematic plan view depicting the kick arm separated from the inner cam of the forward gear.

(4) When the tape ends, the reel gear 7 and the fast forward gear 8 stop but the forward gear 4 is rotating so that the heart-shaped inner cam 12 of the forward gear 4 causes the kick arm 11 to turn to be lifted up to the crest of the heart-shaped inner cam 12. As the fast forward gear 8 is stopped, however, the kick arm 11 does not return by the reset arm 15 and the reset spring 16 and stays at that position.

Figure 4:
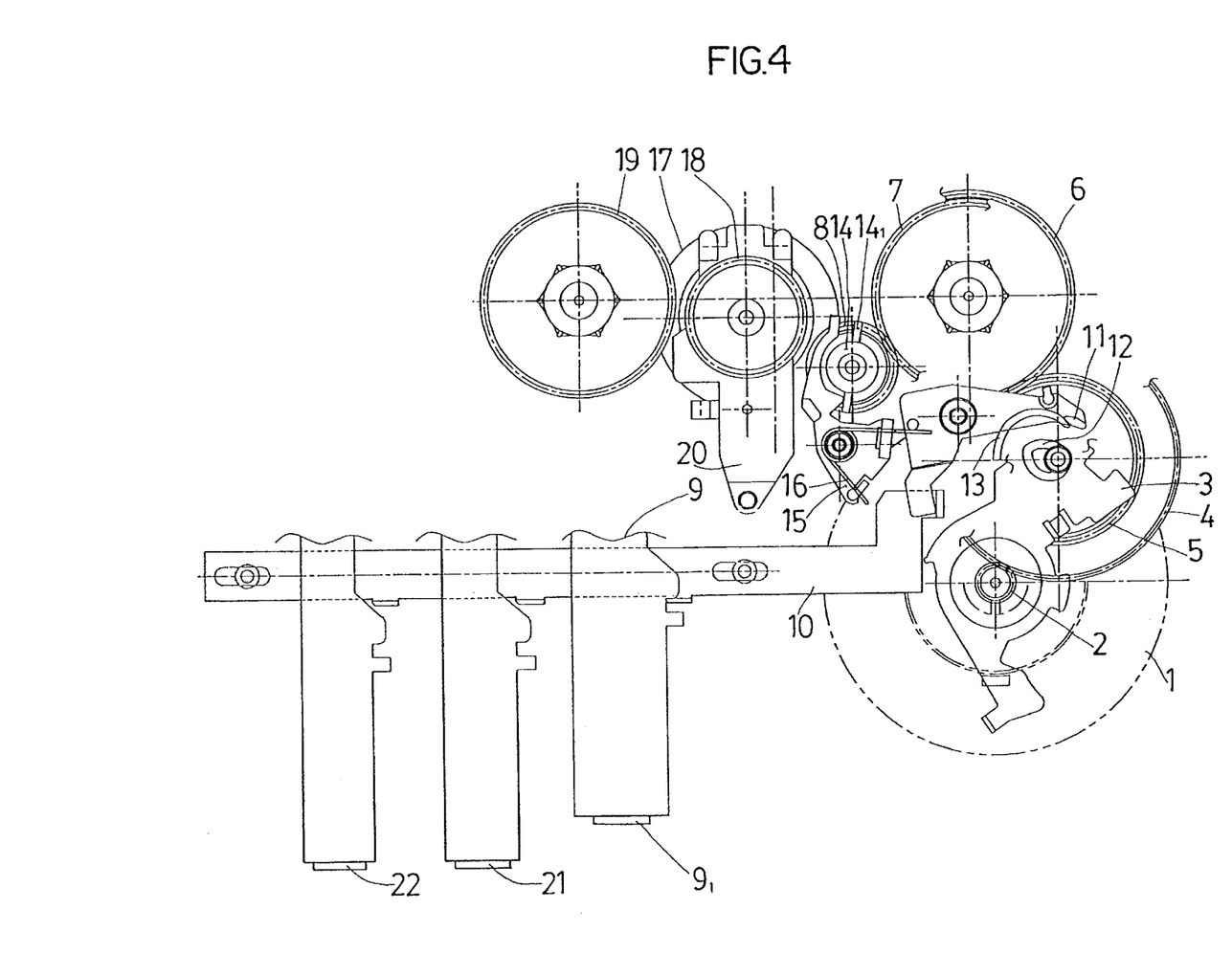
FIG. 4 is a schematic plan view illustrating the kick arm abutting against by the outer cam of the forward gear.

(5) As the forward gear 4 turns further, the kick arm 11 is turned further by the crescent-shaped outer cam 13 of the forward gear 4 (FIG. 4).

Figure 5:
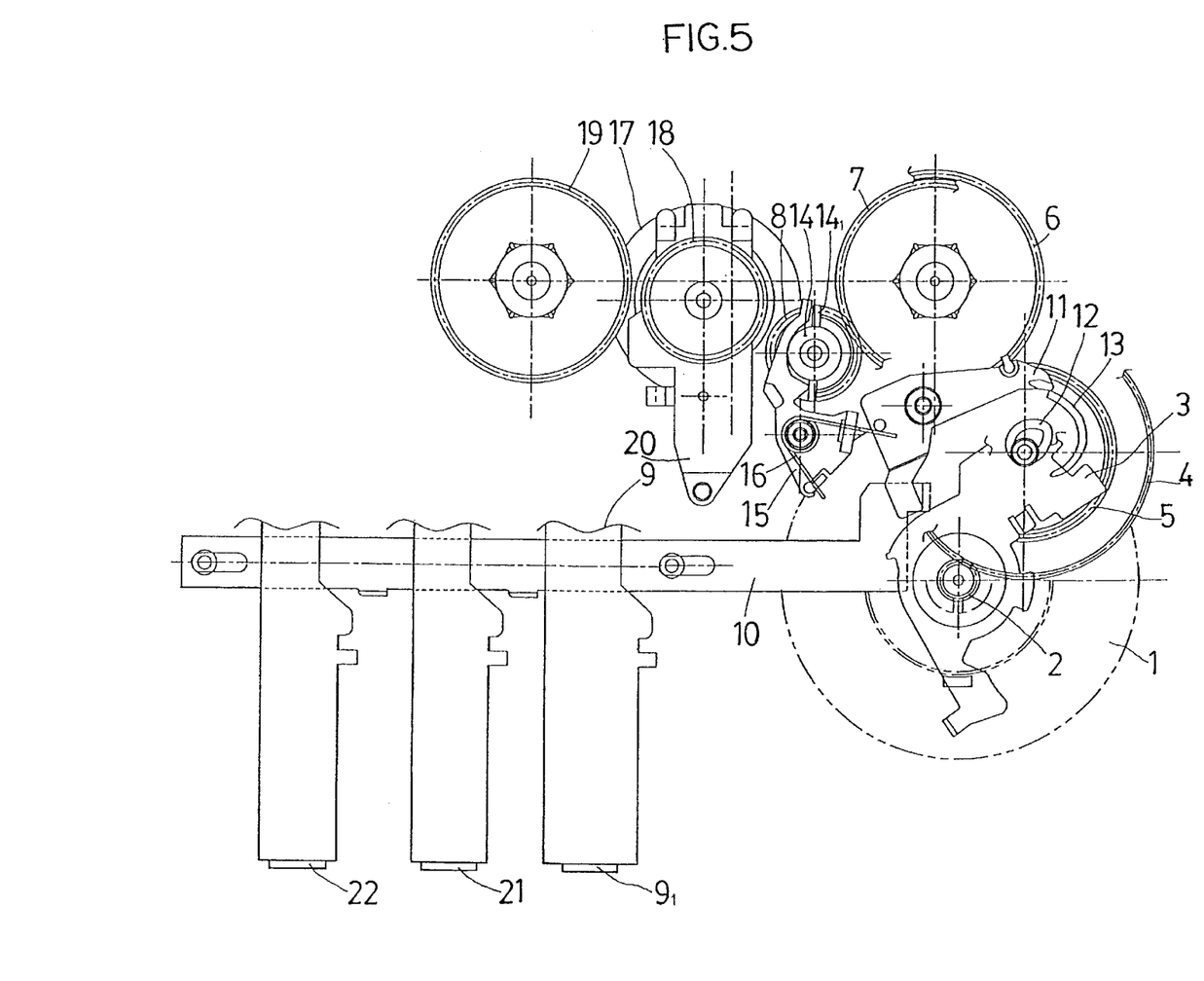
FIG. 5 is a schematic plan view showing a head base unlocked.

(6) When the kick arm 11 turns to the crest of the crescent-shaped outer cam 13 of the forward gear 4, the kick arm 11 pushes the lock plate 10 and causes the lock plate 10 to slide, unlocking the head base 9 and setting the stop state (FIG. 5).

2. Stop→Fast Forward→Autostop

[Transmission of Rotation]

(1) Rotation of Reel System

Transmission via the motor and the belt→fly-wheel 1→transmission via the belt→rewind pulley 17→rewind gear 18→fast forward gear 8→reel gear 7.

(2) Rotation of Fly-wheel System

Transmission via the motor and the belt→fly-wheel 1→fly-wheel gear 2→forward gear 4.

[Operation]

Figure 6:
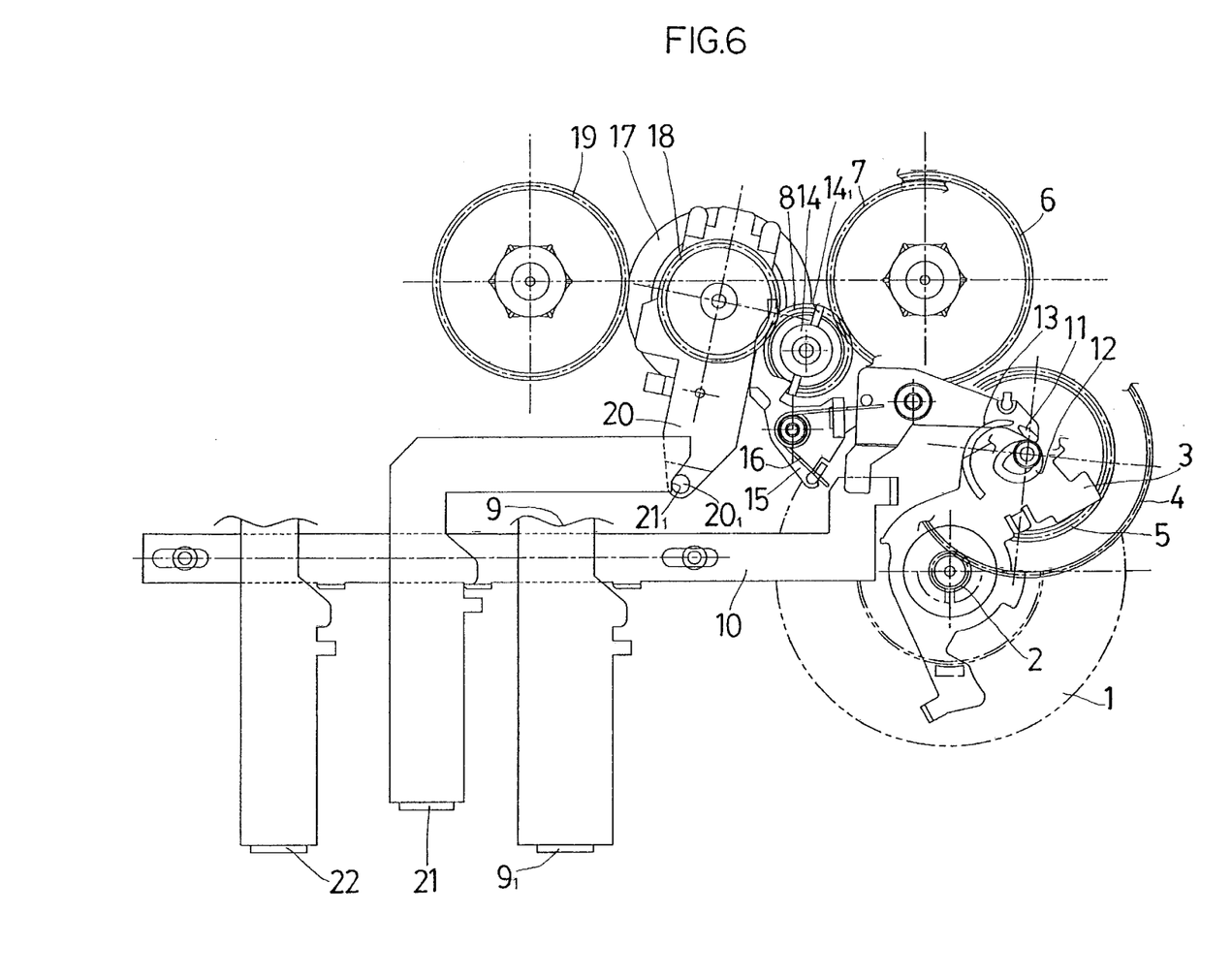
FIG. 6 is a schematic plan view showing the autostop mechanism in a fast forward mode.

(1) As the fast forward lever 21 is pushed, the lock plate 10 slides to be locked. At this time, the distal end 21$_1$ of the fast forward lever 21 engages with the pin 20$_1$ of the center arm 20 (FIG. 6).

Figure 7:
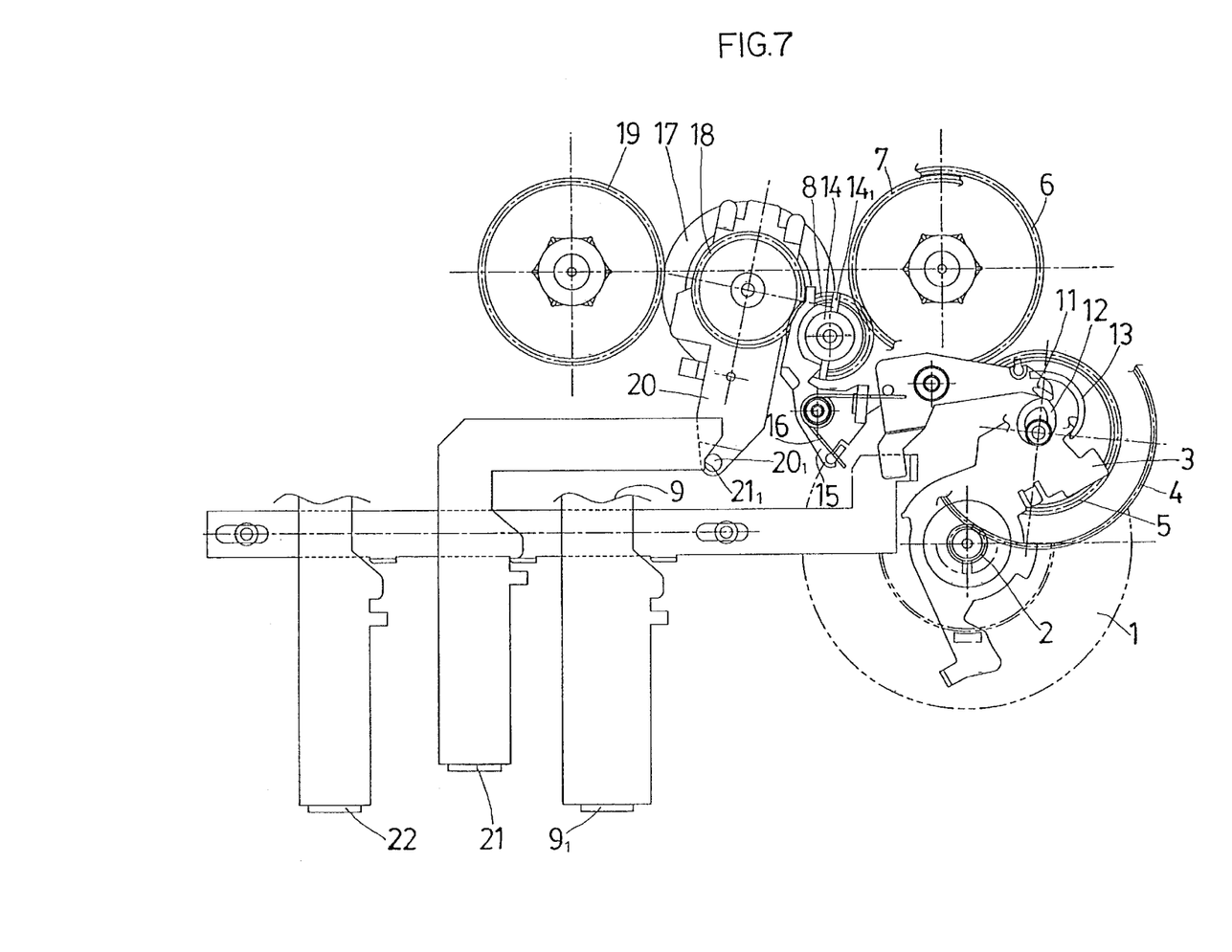
FIG. 7 is a schematic plan view illustrating the kick arm pushed up by the inner cam of the forward gear in the fast forward mode.

(2) The motor, the fly-wheel 1 and the fly-wheel gear 2 rotate, so that the kick arm 11 is pushed up by the hear-shaped inner cam 12 of the forward gear 4. At this time, the distal end 21$_1$ of the fast forward lever 21 likewise engages with the pin 20$_1$ of the center arm 20 (FIG. 7).

(3) Rotation is transmitted in the route of the motor→fly-wheel 1→rewind pulley 17→rewind gear 18→fast forward gear 8→reel gear 7, rewinding the tape.

The blade 14$_1$ of the sensor 14 causes the reset arm 15 to swing, causing the kick arm 11 to return in such a way as to swing along the inner cam 12 of the forward gear 4, so that the fast forward mode continues.

(4) With regard to the rotation of the reel system, when the tape ends, the reel gear 7, the fast forward gear 8 and the rewind gear 18 stop in the named order, and the rewind pulley 17 and the motor rotate. As regards the rotation of the fly-wheel system, all the parts including the forward gear 4 are rotating. The state in which the fast forward gear 8 stops and the forward gear 4 rotates is the same as the state that is brought when playing the tape ends, and autostop is carried out in the same operation for ending the playing (FIG. 5).

3. Stop→Rewind→Autostop

[Transmission of Rotation]

(1) Rotation of Reel System

Transmission via the motor and the belt→fly-wheel 1→rewind pulley 17→rewind gear 18→left reel gear 19.

(2) Rotation of Fly-wheel System

Transmission via the motor and the belt→fly-wheel 1→fly-wheel gear 2→forward gear 4.

[Operation]

Figure 8:
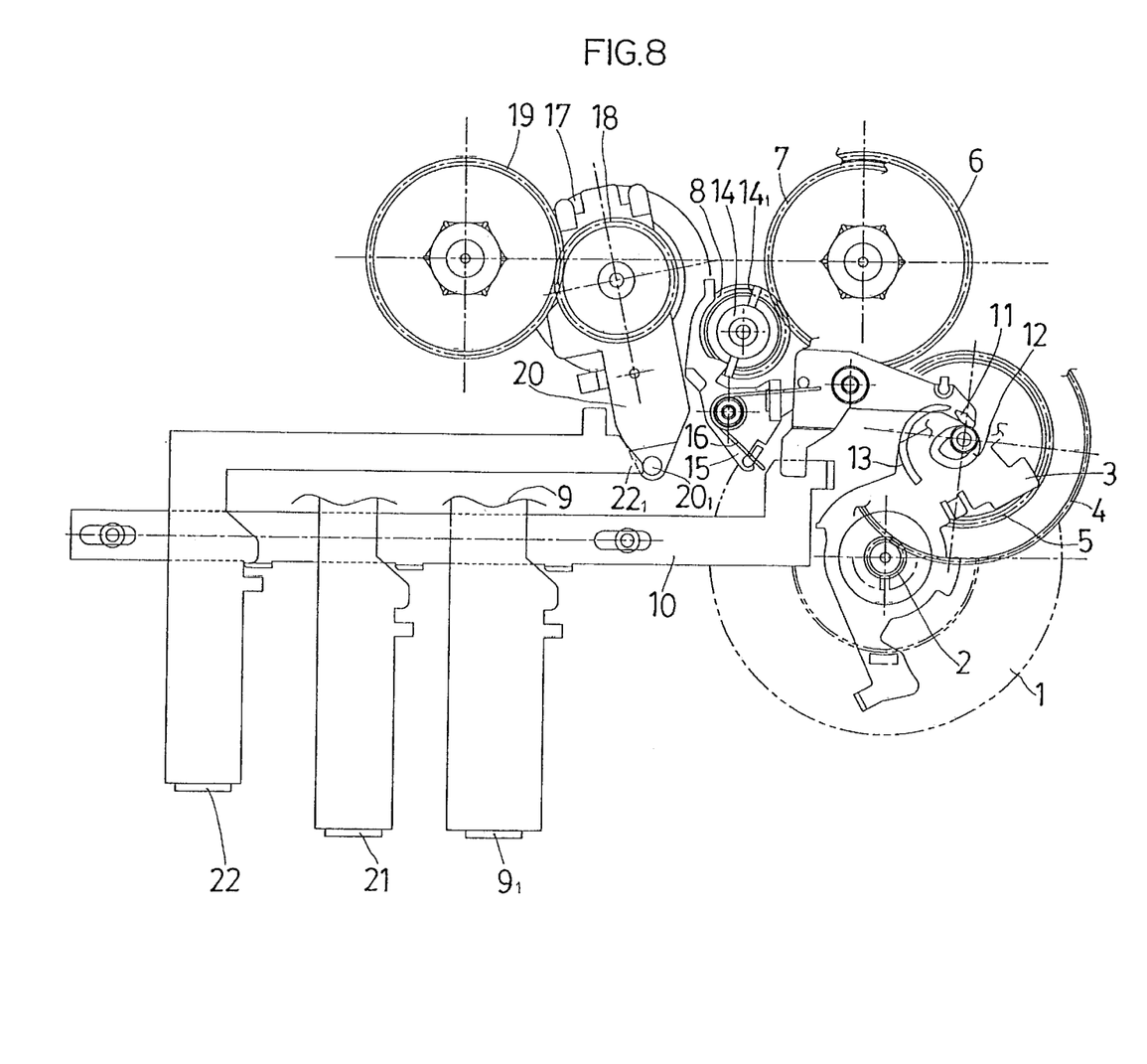
FIG. 8 is a schematic plan view showing the autostop mechanism in a rewind mode.

(1) As the rewind lever 22 is pressed, the lock plate 10 slides to be locked. At this time, the distal end 221 of the rewind lever 22 pushes the pin 20$_1$ of the center arm 20 (FIG. 8).

Figure 9:
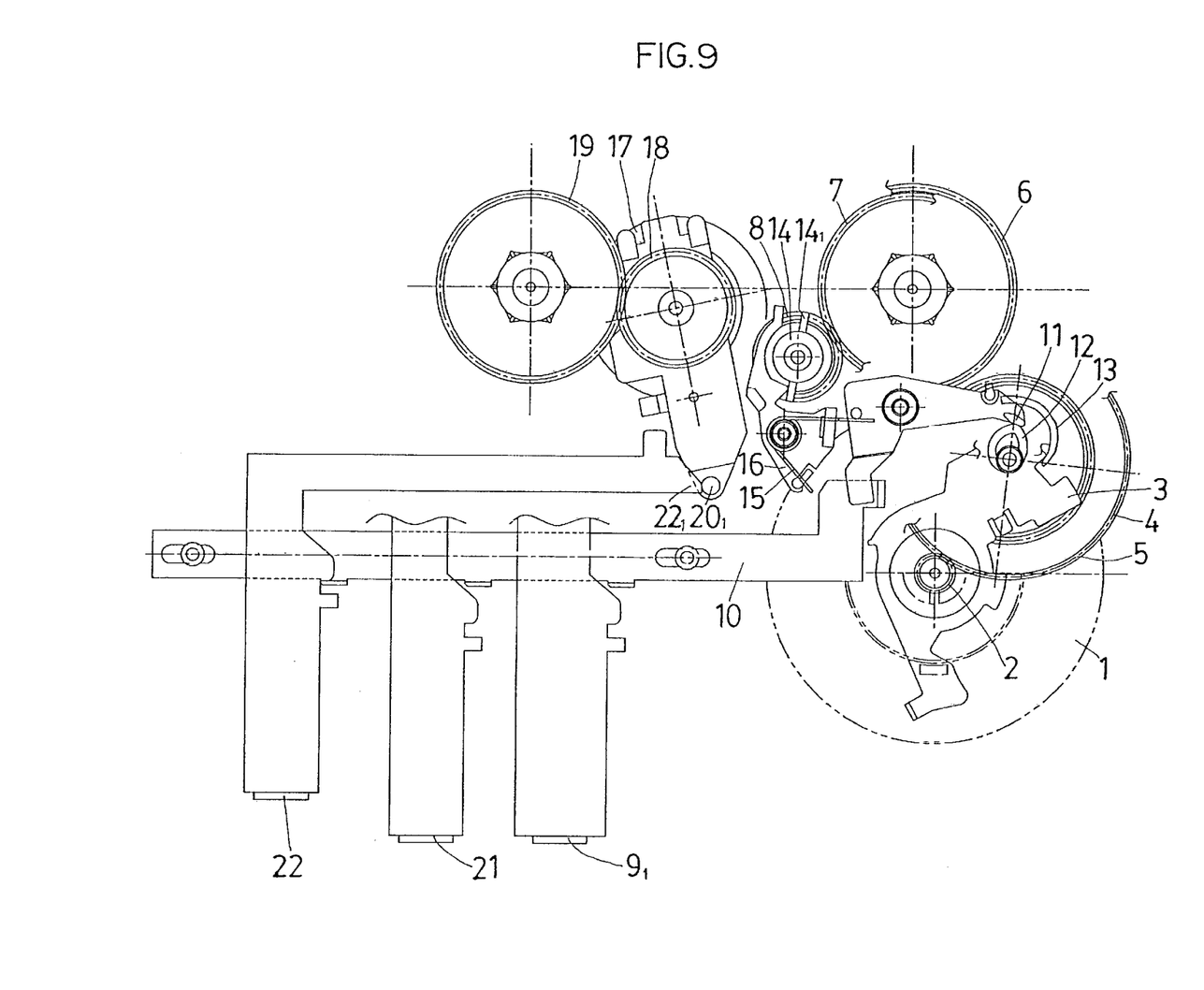
FIG. 9 is a schematic plan view depicting the kick arm pushed up by the inner cam of the forward gear in the rewind mode.

(2) The motor and the belt, the fly-wheel 1 and the flywheel gear 2 rotate, and the kick arm 11 is pushed up by the hear-shaped inner cam 12 of the forward gear 4. At this time, the distal end 21$_1$ of the rewind lever 22 pushes the pin 20$_1$ of the center arm 20 as done in FIG. 8 (FIG. 9).

(3) Rotation is transmitted in the route of the motor—fly-wheel 1→rewind pulley 17→rewind gear 18→reel gear 19, rewinding the tape. The blade 14$_1$ of the sensor 14 causes the reset arm 15 to swing. The reset spring 14$_1$ attached to the reset arm 15 also swings in such a way as to swing along the heart-shaped inner cam 12 of the forward gear 4, so that the rewind mode continues.

(4) With regard to the rotation of the reel system, when the tape ends, the reel gear 19 and the rewind gear 18 stop in the named order, and the rewind pulley 17 and the motor rotate.

As regards the rotation of the fly-wheel system, all the parts including the forward gear 4 are rotating.

The state in which the fast forward gear 8 stops and the forward gear 4 rotates is the same as the state that is brought when playing the tape ends, and autostop is carried out in the same operation for ending the playing (FIG. 5).

According to this invention, as described above, the use of a spring is facilitated by separating a rotational member from the reel base and attaching it to the fast forward gear, whereby friction produced by the urging force of the spring stabilizes the operational force, thus ensuring a stable operation and improved durability.

The provision of the kick arm to unlock the lock plate can permit the autostop mechanism to be accommodated in narrow space and can ensure a surer autostop operation, thus improving the design quality. As it is possible to electively use the space below a cassette tape when it is loaded, the auto-stop mechanism can be made compact. This can widen the application range from the view point of the design.

What is claimed is:

1. An autostop mechanism for a tape driving apparatus, comprising:

a head base for setting said tape driving apparatus in an operational mode;

a lock plate for locking said head base at an operational position in response to movement of said head base when said head base is moved to said operational position;

a sensor, attached coaxially to a fast forward gear always rotatable in synchronism with a reel base, in such a way as to be rotatable in both right and left directions, following said fast forward gear by means of contact friction with said fast forward gear, said sensor being urged in a rotational direction of said fast forward gear by said contact friction with said fast forward gear;

a swingable reset arm to be urged in one direction by a torque of said sensor even when said fast forward gear is rotating in either said right or left direction;

a forward gear having an inner cam and an outer cam, for transmitting drive force to said reel base;

a swingable reset arm arranged in contact with said inner and outer cams and being rotatably supported; and a reset spring capable of pressing a kick arm, attached to said reset arm, against said inner cam and said outer cam, whereby when said torque of said sensor disappears as said reel base stops, pressing force of said reset arm pressing said kick arm via said reset spring is gone, a cam-contact portion of said kick arm stays apart from said inner cam, said fast forward gear keeps rotating so that said cam-contact portion of said kick arm abuts against said outer cam, causing said kick arm to swing, thereby pressing said lock plate to unlock said head base.

* * * * *